US007103881B2

(12) United States Patent
Stone

(10) Patent No.: US 7,103,881 B2
(45) Date of Patent: Sep. 5, 2006

(54) VIRTUAL MACHINE TO PROVIDE COMPILED CODE TO PROCESSING ELEMENTS EMBODIED ON A PROCESSOR DEVICE

(75) Inventor: Alan E Stone, Morristown, NJ (US)

(73) Assignee: Intel Corporation, Santa Clara, CA (US)

( * ) Notice: Subject to any disclaimer, the term of this patent is extended or adjusted under 35 U.S.C. 154(b) by 685 days.

(21) Appl. No.: 10/316,606

(22) Filed: Dec. 10, 2002

(65) Prior Publication Data

US 2004/0111715 A1 Jun. 10, 2004

(51) Int. Cl.
*G06F 9/44* (2006.01)
*G06F 9/45* (2006.01)

(52) U.S. Cl. .................. 717/148; 717/140; 717/149

(58) Field of Classification Search ........ 717/140–149, 717/136–145
See application file for complete search history.

(56) References Cited

U.S. PATENT DOCUMENTS

| 5,452,461 | A * | 9/1995 | Umekita et al. ............ 717/149 |
| 6,092,097 | A * | 7/2000 | Suzuoka ..................... 709/201 |
| 6,158,048 | A * | 12/2000 | Lueh et al. ................. 717/118 |
| 6,289,506 | B1 * | 9/2001 | Kwong et al. .............. 717/148 |
| 6,295,642 | B1 * | 9/2001 | Blandy ....................... 717/148 |
| 6,317,872 | B1 * | 11/2001 | Gee et al. ................... 717/152 |
| 6,374,286 | B1 * | 4/2002 | Gee et al. ................... 718/108 |
| 6,481,006 | B1 * | 11/2002 | Blandy et al. .............. 717/139 |
| 6,606,743 | B1 * | 8/2003 | Raz et al. ................... 717/148 |
| 6,654,954 | B1 * | 11/2003 | Hicks ......................... 717/162 |
| 6,658,655 | B1 * | 12/2003 | Hoogerbrugge et al. .... 717/139 |
| 6,691,306 | B1 * | 2/2004 | Cohen et al. ............... 717/139 |
| 6,704,926 | B1 * | 3/2004 | Blandy et al. .............. 717/148 |
| 6,718,539 | B1 * | 4/2004 | Cohen et al. ............... 717/136 |
| 6,760,906 | B1 * | 7/2004 | Odani et al. ................ 717/149 |
| 6,820,252 | B1 * | 11/2004 | Sakamoto et al. .......... 717/136 |
| 6,851,108 | B1 * | 2/2005 | Syme et al. ................ 717/146 |
| 6,851,109 | B1 * | 2/2005 | Alexander et al. ......... 717/148 |

OTHER PUBLICATIONS

Yanagisawa et al, "Development methodology of ASIP based on Java byte code using HW/SW co design system for processor design", IEEE, ICDCSW, pp. 831-837, 2004.*
Feeley et al, "A parallel virtual machine for efficient scheme compilation", ACM pp. 119-130, 1990.*
Herbordt et al, "Preprototyping SIMD coprocessor using virtual machine emulation and trace compilation", ACM Sigmetrics, pp. 88-99, 1997.*
Grimshaw et al, "Portable run time support for dynamic object orienetd parallel processing", ACM Trans. on Computer Sys. vol. 14, No. 2, pp. 139-170, 1996.*
Ootsu et al—Preliminary evaluation of a binary translation system for multithreaded processors—IEEE, Jan. 10, 2002, pp. 77-84.
Stevens—Muchnek—Advanced compiler design and implementation—1997—Morgan Kaufmann Publishers—pp. 172-177.
Chen et al—Exploiting method-level parallelism in single-threaded Java programs—Parallel Architectures and Compilation Techniques, Proceedings Oct. 12, 1998 pp. 176-184.

* cited by examiner

*Primary Examiner*—Anil Khatri
(74) *Attorney, Agent, or Firm*—Ted A. Crawford

(57) ABSTRACT

A virtual machine receives a first set of code. At least a portion of the first set of code is provided to a compiler and is partitioned into a plurality of groupings of code. At least one of the groupings of code is compiled into a plurality of second sets of code. At least two of the second sets of code are provided to differing processor resources. The differing processor resources include a plurality of processing elements embodied on one processor device.

36 Claims, 3 Drawing Sheets

VIRTUAL MACHINE TO PROVIDE COMPILED CODE TO PROCESSING ELEMENTS EMBODIED ON A PROCESSOR DEVICE

BACKGROUND

Software is typically written in a high-level language, and then compiled into machine-readable language, or native instructions, for execution by a processor. A virtual machine may assist in compiling the high level language. As part of the compiling process, the various functions of the software may be mapped to particular modules of the processor for execution. This approach for processor programming may be adequately efficient for programming of a single processor or a device comprising a symmetric multi-processor platform, but may not be a particularly efficient approach for programming a device with multiple heterogeneous processing elements such as a network processor.

Programming a multi-core processor such as a network processor may entail making determinations such as which processor core will execute particular modules, and may require the programmer to make determinations concerning partitioning of functions, and how best to utilize each processing core. This may cause programming a multi-core processor to be burdensome and complex, as well as making the use of available processing resources less efficient. A need exists, therefore, for an improved method of writing code, and a virtual machine including the capability to use processor. resources more efficiently.

BRIEF DESCRIPTION OF THE DRAWINGS

The subject matter regarded as embodiments of the claimed subject matter is particularly pointed out and distinctly claimed in the concluding portion of the specification. Embodiments of the claimed subject matter, however, both as to organization and method of operation, together with objects, features, and advantages thereof, may best be understood by reference to the following detailed description when read with the accompanying drawings in which:

DETAILED DESCRIPTION

Figure 1:
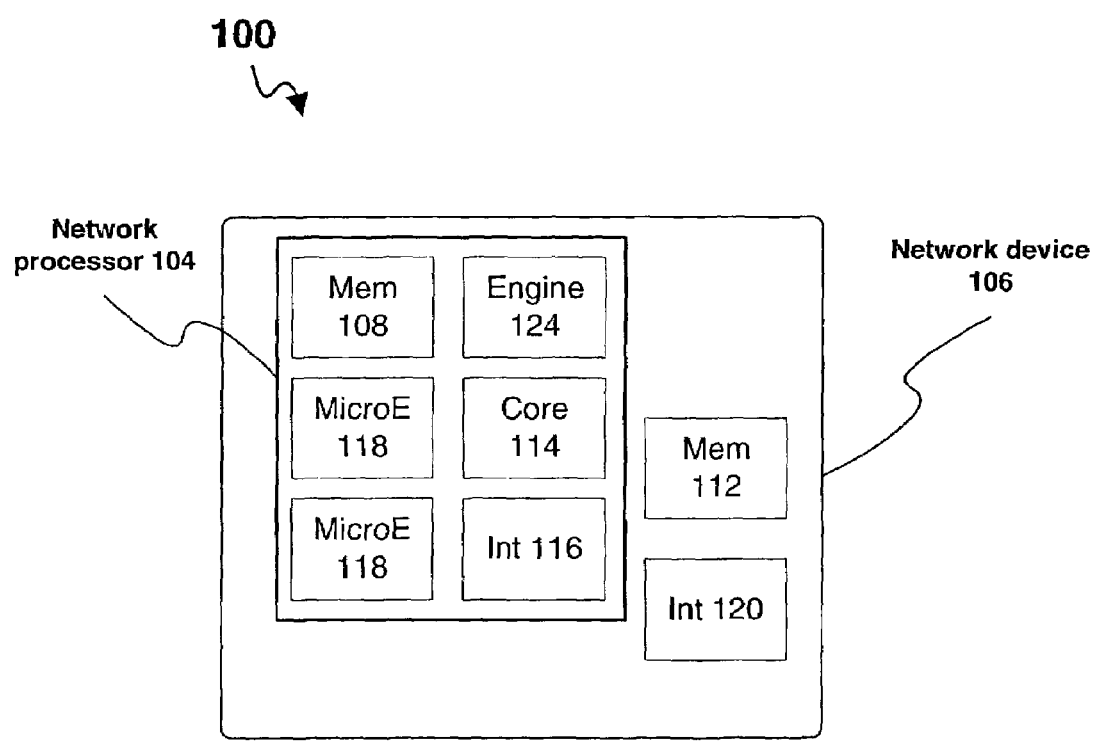
FIG. 1 is a device suitable for practicing one embodiment of the claimed subject matter.

Embodiments of the claimed subject matter may comprise a virtual machine for network processors. Traditionally, a computing device such as a network device may contain a processor, such as a network processor, and may be comprised of one or more processing elements. A network processor may execute code referred to as assembly language, which is low-level language specifically written for the particular type of processor. The assembly language code for one type or class of processor is typically not compatible with another type of processor. For example, low-level assembly language written specifically for an Intel® Xscale RISC processor may not be executable on an Intel® Pentium™ processor, due to the varying types of instructions sets used by the two processors. This may result in the need to write several versions of the same software to accomplish the same functions depending on the type of processor executing the software. To help solve this problem, higher-level programming languages, which may also be referred to as universal programming languages, have been developed that largely make the underlying processor unknown. For example, the C, C++, BASIC, and FORTAN languages all allow a programmer to write code that is not particularly processor specific. A compiler for a specific processor receives the source code written in such a language and may generate instructions for a specific target processor. These approaches do not include the ability to target multiple, heterogeneous processing elements however.

Lately, these so called universal programming languages may provide programmers with the ability to write code for a particular function once, and use it for several different computing devices or processors by abstracting processor instruction sets so that computing functions are similar across varying platforms. An additional example of these programming languages that is not processor specific, and that may rely on one or more virtual machines to abstract the instructions for the underlying processor may include Java and C# for example. These types of languages are typically compiled to a fixed, standardized collection of virtual machine instructions that may remain constant regardless of the target processor that will receive the code. These virtual instructions are commonly referred to as byte codes. The byte codes may be grouped into one or more byte code modules, and one or more byte code modules may comprise a byte code assembly. These byte code instructions are eventually compiled into a form of machine code native to a particular device where the device receiving the byte codes may utilize a byte code compiler including a virtual machine to perform the compiling.

A network processor may utilize one or more types of virtual machine when compiling code. A virtual machine m ay provide some level of functionality between a high level set of instructions, the compiler, and the resultant compiled code. A virtual machine may, for example, determine the run time linkage, or map the byte code modules to various modules of the processor for execution. However, virtual machines do not present one or more heterogeneous processing elements as a single processor for the purposes of programming, as shown in more detail later.

Additionally, network processors, such as Intel® IXP 2800 based network processors, may contain multiple processing elements, which may include, for example, multiple microengines and a processor core. Typically, code such as byte codes are written for an individual processing element, and there is no ability of the virtual machine to map byte code modules designated for a particular processing element to another processing element for execution, or to make any determination with respect to partitioning byte code modules or portions of byte code modules between one or more processing elements. Additionally, byte code modules are typically treated as being relationally distinct, meaning, for example, that when a set of modules is submitted to a virtual machine, the functionalities of all modules may not be considered when determining such qualities as run time linkage, even though the modules may require utilization of the same processing element or perform complimentary or related functions. Due at least in part to these limitations, it may be necessary to write software for each processing element, and make a determination at the time the software is submitted to the virtual machine how to partition each task and which processing element will execute each task. This may result in inefficient use of the processing capabilities of a network processor, as well as adding complexity to programming of a multi-core processor such as a network processor, as shown in more detail later.

Embodiments of the claimed subject matter may comprise a virtual machine including the capability to receive one or more byte code modules and map one or more byte code modules to one or more processing elements of a multi-core processor, where the multi-core processor may be comprised of multiple heterogeneous processing elements such as one or more microengines and/or one or more processor cores, for example. The mapping may be performed based at least in part on the available resources of the processor, and one or more of the desired functions of the one or more byte code modules.

It is worthy to note that any reference in the specification to "one embodiment" or "an embodiment" means that a particular feature, structure, or characteristic described in connection with the embodiment is included in at least one embodiment of the claimed subject matter. The appearances of the phrase "in one embodiment" in various places in the specification are not necessarily all referring to the same embodiment.

Numerous specific details may be set forth herein to provide a thorough understanding of the embodiments of the claimed subject matter. It will be understood by those skilled in the art, however, that the embodiments of the claimed subject matter may be practiced without these specific details. In other instances, well-known methods, procedures, components and circuits have not been described in detail so as not to obscure the embodiments of the claimed subject matter. It can be appreciated that the specific structural and functional details disclosed herein may be representative and do not necessarily limit the scope of the claimed subject matter.

Referring now in detail to the drawings wherein like parts are designated by like reference numerals throughout, there is illustrated in FIG. 1 a device suitable for practicing one embodiment of the claimed subject matter. FIG. 1 is a block diagram of a device 100, which may comprise a device such as network device 106. Network device 106 may comprise a multiservice switch, broadband access platform, web switch or a network appliance, for example. In this embodiment, network device 106 may be comprised of a network processor 104, such as the Intel® IXP2800 Network Processor. Network device 106 may also comprise one or more types of memory 112, which may include, for example, Synchronous Dynamic Random Access Memory (SDRAM) and a Static Random Access Memory (SRAM), for example, and one or more interfaces 120, which have the capability to communicate with one or more other devices. One or more of the components of network device 106 may communicate through one or more buses (not shown) such as a PCI bus, for example. Network processor 104 may be comprised of one or more types of internal memory 108, such as SRAM or SDRAM, for example, and one or more types of interfaces 116, which may include a bus interface, for example. Network processor 104 may additionally include one or more processing elements such as processor core 114, which may be an Intel® StrongARM® Core (ARM is a trademark of ARM Limited, United Kingdom) for example. Processor core 114 may also include a central controller (not shown) that assists in loading code for other resources of the network processor, for example, and performs other general-purpose computer type functions such as handling protocols, exceptions, and extra support for packet processing. Network processor 104 may additionally contain Engine 124, which may comprise one or more hardware specific acceleration functions such as an encryption engine, a CRC checker or a multiplying engine, for example. Engine 124 may include the capability to perform one or more specialized functions that may be offloaded from one or more processor elements, for example, but may not be classified as a processor element.

Network processor 104 may include one or more additional processing elements such as microengines 118, which may, in operation, be configured to interact with processor core 114. One or more microengines 118 may include memory (not shown) that may have the capability to store instructions, for example. In one embodiment, there are sixteen microengines, and each microengine includes the capability to process eight program threads. The sixteen microengines may operate with shared resources including memory system 108, engine 124 and bus interface 116, for example, although alternative configurations exist. It is important to note that the claimed subject matter may be applicable to any processor that has more than one processor core and/or more than one microengine.

Figure 2:
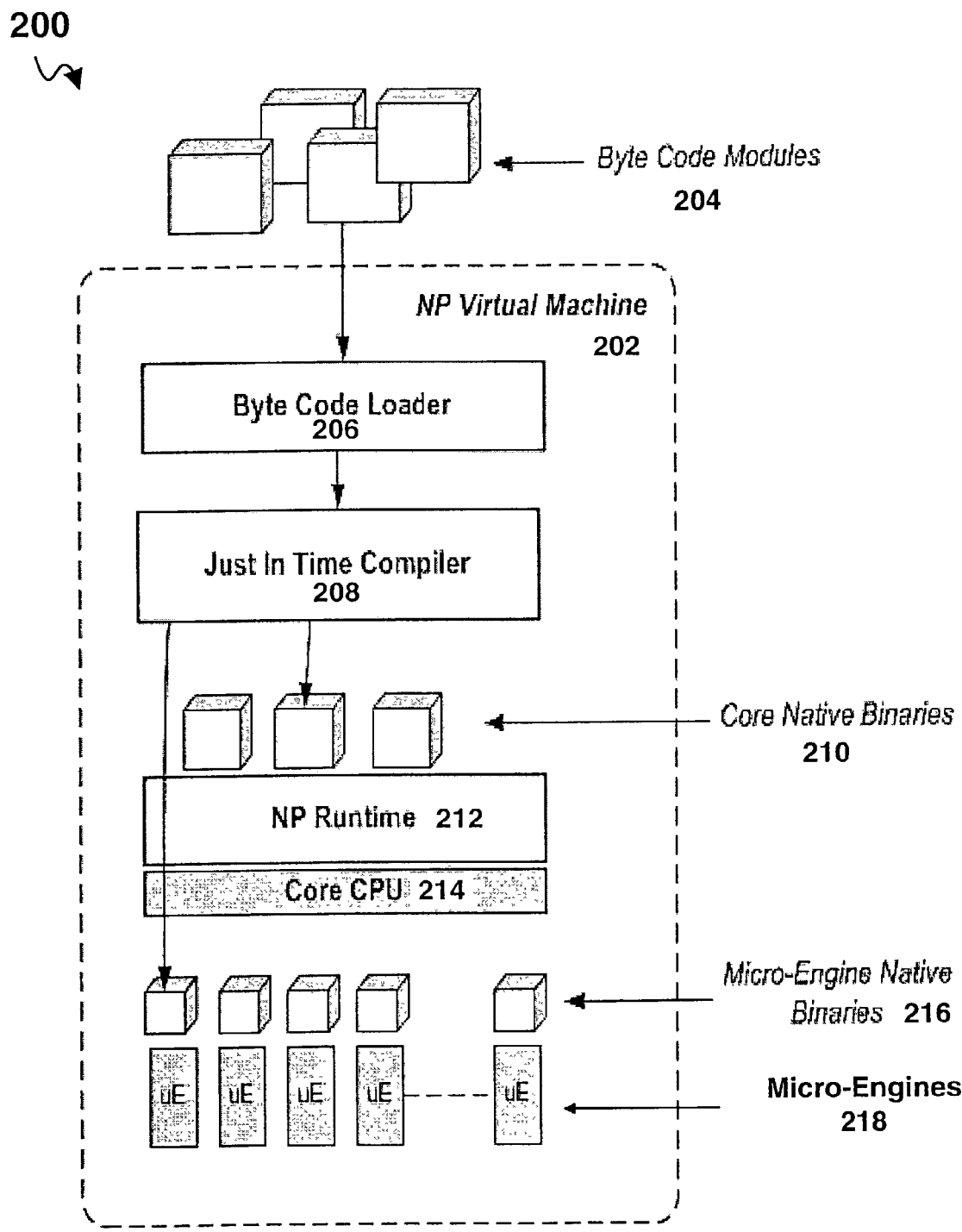
FIG. 2 is a block diagram of a virtual machine in accordance with one embodiment of the claimed subject matter.

FIG. 2 illustrates a system 200 that incorporates functionality that may be implemented as software executed by a processor. The processor that executes the software may be a general-purpose or dedicated processor, such as a processor from the family of processors made by Intel Corporation, or one or more of the processors described previously in reference to network processor 104 of FIG. 1. The software may comprise programming logic, instructions or data to implement certain functionality for an embodiment of the claimed subject matter. The software may be stored in a medium accessible by a machine or computer-readable medium, such as read-only memory (ROM), random-access memory (RAM), magnetic disk (e.g., floppy disk and hard drive), optical disk (e.g., CD-ROM) or any other data storage medium. In one embodiment of the claimed subject matter, the media may store programming instructions in a compressed and/or encrypted format, as well as instructions that may have to be compiled or installed by an installer before being executed by the processor. Alternatively, an embodiment of the claimed subject matter may be implemented as specific hardware components that contain hard-wired logic for performing the recited functionality, or by any combination of programmed general-purpose computer components and custom hardware components.

In one embodiment of the claimed subject matter, system 200 may comprise a virtual machine. As stated previously, a virtual machine may be configured to receive one or more byte codes that may not be specific to a particular processing element, interpret the one or more byte codes, and compile and/or map the one or more byte codes for use by one or more processing elements. In operation, a virtual machine such as the one described may provide a programmer with a uniform view of a processor being programmed, providing the programmer with a common paradigm of a single monolithic processor, regardless of the number of processing elements making up the processor being programmed.

In operation, virtual machine 202 may receive one or more byte code modules 204. The byte code loader 206 may receive the one or more modules 204, although multiple methods of receiving one or more byte code modules may be utilized. In this context, received may comprise functionality including at least partially interpreting or reading the one or more byte code modules, and is not limited to physical receiving of the modules. The byte code loader 206 typically acts as a logical byte code receiver interface between a program used to create or assemble one or more byte codes, and the virtual machine 202. After receipt of one or more byte code modules 204, at least a portion of the content of the modules may be provided to a compiler, such as a just in time (JIT) compiler 208. JIT compiler 208, after receiving one or more byte code modules 204, compiler 208 may perform one or more compiling tasks, including determining resource allocation such as the run time linkage of one or more byte codes, for example. The run time linkage, in one embodiment, may be one type of resource allocation, where modules 204 may be assigned, in whole or part, to one or more processing elements for execution.

For example, loader 206 may receive a byte code module. Loader 206 may provide this module to the JIT compiler 208. The JIT compiler 208 may map a portion of the functions of the module to the core processor 214 of the network processor, by compiling the portion of the module into native instructions of processor 214, shown here as core native binaries 210. Additionally, the JIT compiler 208 may map another portion of the module to one or more other resources, such as engine 124 or microengines 218, by compiling the other portion of the module into native instructions of microengine 218, shown here as microengine native binaries 216, also referred to as microblocks. The core processor and one or more microengines that received the one or more microblocks may then execute one or more of the microblocks. Specific functions of the JIT compiler may be better understood with reference to FIG. 3.

Figure 3:
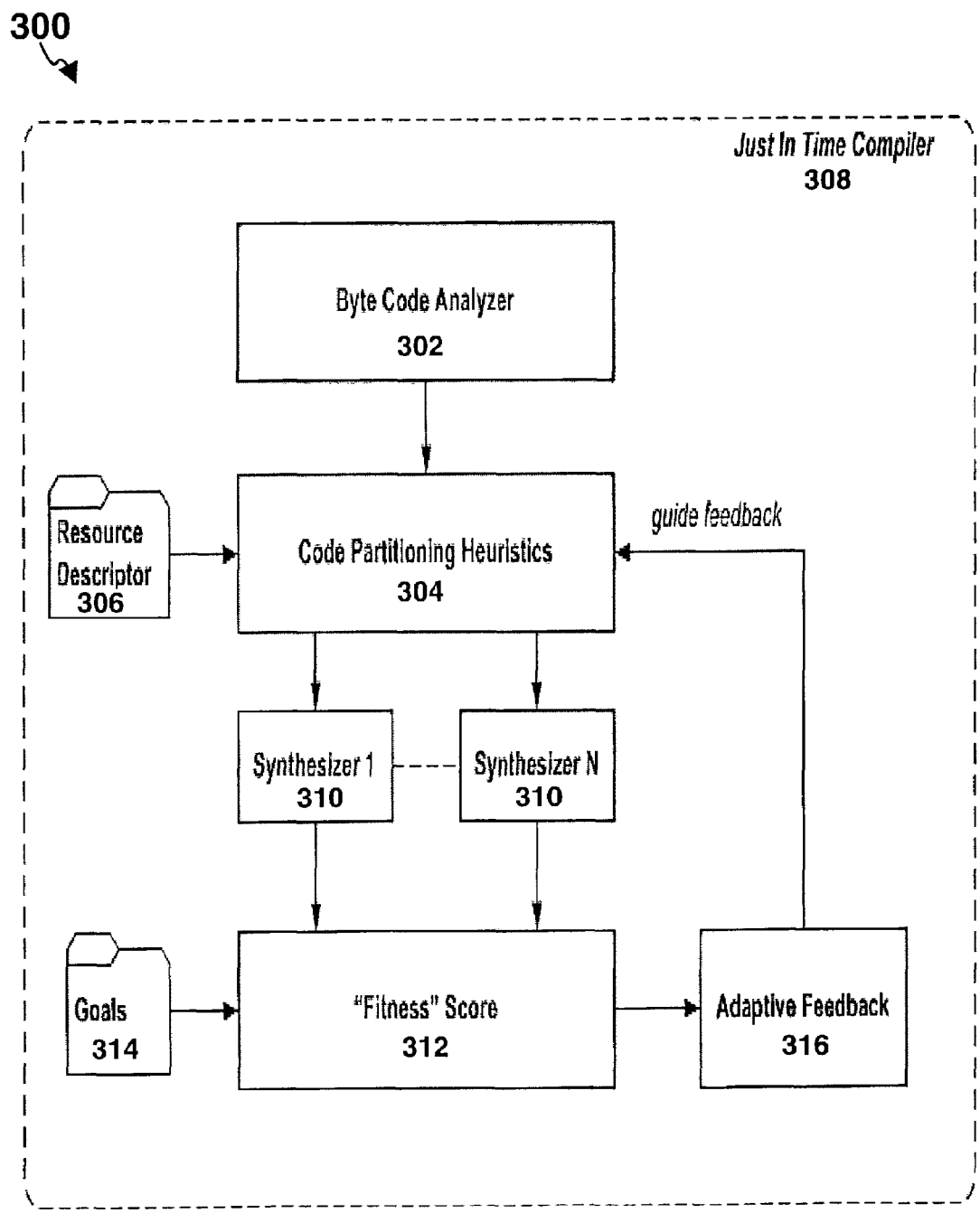
FIG. 3 is a block diagram of a compiler in accordance with one embodiment of the claimed subject matter.

FIG. 3 is a block flow diagram of a JIT compiler, which may be functionally similar to JIT compiler 208 of FIG. 2. Shown in FIG. 3 is a block diagram of a JIT compiler 300, demonstrating the programming logic performed by a virtual machine in accordance with one embodiment of the claimed subject matter. In this embodiment, virtual machine may refer to the software and/or hardware used to implement the functionality of one or more blocks as described herein. In this embodiment of the claimed subject matter, the management system may be implemented as part of network device 106. It can be appreciated that this functionality, however, may be implemented by any device, or combination of devices, located anywhere in a communication network and still fall within the scope of the claimed subject matter.

In operation, an implementation of programming logic illustrated in FIG. 3 may perform the following functions, but the order presented does not infer a particular order of execution of the following functions when implemented. Byte Code Analyzer 302 may be provided with one or more byte code modules or one or more byte code assemblies, and the one or more modules or assemblies may be received from a byte code loader such as Loader 206. Analyzer 302 may interpret the one or more byte codes, which may comprise reading at least a portion of the contents of one or more byte codes to at least partially determine one or more of the functions represented in the module. Analyzer 302 may include functionality to determine a relational structure between one or more functions of one or more byte codes, which may be referred to as an abstract syntax graph, explained in more detail later. In one embodiment, Analyzer 302 may assemble the one or more byte codes into one or more tasks, and, in this context, a task may comprise a portion of one or more byte codes, for example.

Code Partitioning Heuristics Engine 304 may receive at least a portion of the syntax graph, which may be comprised of one or more tasks. Engine 304 may, based at least in part on the abstract syntax graph, one or more tasks, and/or one or more heuristics associated with the Engine, determine factors such as resource needs to execute the one or more tasks, the capability of one or more processors to perform tasks sequentially or parallel, and the ability to partition tasks, for example. Engine 304 may at least partially partition the one or more tasks into one or more sub-tasks, based on one or more of the above-referenced factors. The one or more tasks or sub-tasks may comprise one or more byte codes, for example. When partitioning, Engine 304 may consider all tasks contained in the one or more byte codes, as well as the resources available to process the tasks, for example. Engine 304 may additionally include the capability to generate one or more logical links between one or more partitioned tasks, which may be, for example, one or more sets of code that provide communication between one or more tasks that may be interdependent and may be processed on different processing elements. For example, a call function may be supplied from one processing element to another, and the code for providing the call function may be generated by Engine 304, for example.

Once the one or more tasks are partitioned for processing by one or more processing elements, the partitioned tasks are sent to Synthesizers 310, where a Synthesizer may be specific for one processing element or other resource, although it is important to note that the claimed subject matter is not so limited. A Synthesizer may perform translation of the non-specific byte codes into specific native instructions for the processing element or resource it is associated with, for example. The partitioned tasks are sent to the Synthesizer 310 that is associated with the processing element or resource designated to processing the one or more tasks. Synthesizers 310 may, for example, in addition to providing the partitioned tasks to a processing element, be capable of providing additional mapping of one or more tasks or sub tasks to the processing element it is associated with. Synthesizers 310 may, for example, alter the mapping scheme proposed by the Engine 304, and may provide additional optimization, or may take advantage of specific hardware characteristics associated with the microengine, such as hardware acceleration, for example, such as engine 124 of FIG. 1.

Proposed mapping information may then be provided to a Scoring Module 312, which may include the capability to determine one or more measures or metrics about the efficiency of the mapping determined by one or more Synthesizers 310 or the Code Partitioning Engine 304. The Scoring Module 312 may receive one or more Goals 314, which may be used to determine one or more metrics. The goals may be introduced in a variety of ways including but not limited to source code instrumentation or annotation, compilation meta-data, configuration files or streams, or external management provisions. Scoring Module 312 may provide a fitness score as an Adaptive Feedback 316 to the Code Partitioning Engine 304. At least a portion of the functions of the virtual machine may be repeated, based at least in part on the fitness score. In one embodiment, the process may be repeated until a threshold tolerance score is reached, or may be repeated a particular number of times, for example. The score, in this context, may be any measuring value or metric that may be used to determine the desirability of a particular mapping scheme. Examples of metrics may include device utilization ratios, execution path latencies, or memory utilization, for example. Once the fitness score is such that repeating at least a portion of the functions of the virtual machine is no longer desirable, the iteration may stop and the partition receiving the most desirable results such as the highest score for partitioning may be utilized. Alternatively, if one or more goals are not met, the mapping scheme may stop and these results may be provided as a notification by way of a virtual machine interface, for example. The functional blocks described in reference to the Compiler 308 may be further described in more detail hereinafter.

In one embodiment, a Byte Code Analyzer 302 may receive or read one or more byte codes and assemble them into an abstract syntax graph. An abstract syntax graph may comprise a relational structure for the byte codes, such as a program, for example. In this context, an abstract syntax graph may comprise any relational structure between two or more functions of the one or more byte codes. An abstract syntax graph may, for example, comprise a collection of edges and vertices, where the vertices indicate functions, and the edges represent execution paths of the functions. It will, of course, be understood that this is just one embodiment, and any abstraction of multiple tasks that provides a comprehension of the tasks as a group may be used in at least one embodiment of the claimed subject matter. In this embodiment, the byte codes are assembled into a program, and this may provide the capability of one or more other modules to determine the one or more objectives of the one or more byte codes as a congruous embodiment.

In one embodiment, a Code Partitioning Heuristics Engine 304 may receive an abstract syntax graph from the Analyzer 302, and may, as part of the syntax graph, receive one or more tasks. In this embodiment, the Engine 304 may have the capability to determine the available resources of a device, such as the number and capabilities of the core processor and microengines, for example. Additionally, Engine 304 may be able to determine other available resources of a device, such as an encryption engine, for example, that may not be associated with a processing element but may be capable of emulating the same functions that may be disclosed in one or more tasks. In this alternative embodiment, one or more functions disclosed by the syntax graph may be mapped to a resource other than one or more processing elements, such as one or more hardware components of a network device, for example, such as Engine 124 of FIG. 1.

The available resources of a device may at least partially be provided from Resource Descriptor 306, which may, for example, comprise information about the one or more resources such as processing elements of a network device, or other available resources such as hardware or software, for example. Resource Descriptor 306 may additionally provide information relating to one or more resources such as processing capabilities, limitation or availability. Additionally, Engine 304 may determine the various objectives of the tasks and may determine factors such as desired timing and priorities of tasks. Engine 304 may determine if one or more tasks may be partitioned into one or more sub tasks, or if some tasks may be processed in parallel with others or if they must be processed sequentially, if, for example, they are stringed or interdependent. Engine 304 may, based on one or more of these factors, map bytes codes or tasks to particular processors of a device. This mapping information may be provided to one or more Synthesizers 310.

In one embodiment, one or more Logical Synthesizers 310 may receive one or more tasks from the Code Partitioning Heuristics Engine 304. A Synthesizer may be associated with an individual processing element of a network device running the virtual machine. For example, JIT Compiler 308 may be comprised of seventeen Logical Synthesizers for a virtual machine executing on an Intel® IXP1200 Network Processor, for example, which has 17 processing elements. Alternatively, a single synthesizer may be associated with one class of processing element, rather than a single processing element. One or more Synthesizers 310 may evaluate the proposed mapping structure of the tasks provided by the Engine 304, and may refine or alter the mapping structure. The refining or altering may be made for any number of reasons, such as efficiency, availability of resources, priorities or limitations of the processor, for example. In other embodiments, the one or more Synthesizers 310 may not perform any alterations to the mapping performed by the Code Partitioning Engine 304. If, however, the one or more Synthesizers 310 do alter the mapping, the one or more Synthesizers 310 may provide the mapping metrics of the one or more tasks to Scoring Module 312. These mapping metrics may be used to determine fitness scoring, which may comprise a measure of how effectively Engine 304 performed partitioning and translation into native binaries of the one or more byte codes.

In one embodiment, fitness scoring comprises determining factors such as the efficiency of the mapping performed by Engine 304, the ability to successfully process tasks based on the mapping, or the available capacity of the processing element or other resources, compared with the mapping or task allocation. Scoring may be based on one or more Goals 314, which may comprise such factors as priorities, desired functionality or timing, for example, and, in one embodiment, may be provided by a user. Alternatively, Goals 314 may be auto-generated and may comprise a program specific attribute, for example. Additionally, one or more metrics may be provided to the Scoring Module 312 from one or more Synthesizers 310, and Scoring Module 312 may determine a score based at least in part on the one or more metrics provided from the one or more Synthesizers 310. Fitness scoring may provide at least a portion of the data to an Adaptive Feedback Module 316.

In one embodiment, Adaptive Feedback Module 316 may receive one or more values from Scoring Module 312, such as a fitness score, and may have the capability to provide alterations to the mapping generated by Engine 304. The mapping may be altered, for example, based at least in part on the one or more values. For example, Module 316 may determine a score, or a change in score over one or more mapping iterations of block flow diagram 300, and may propose one or more alterations to the Code Partitioning Engine 304 based on trends such as the change in score over one or more iterations. In this embodiment, a threshold value may be used to determine if alterations to the mapping or partitioning are desirable. If one or more changes are desirable, this information is supplied to Engine 304, where one or more changes may be implemented. The information may be supplied, for example, through a logical interface (not shown) that may allow input from Adaptive Feedback Module 316.

It can be appreciated that the embodiments may be applied to any device containing at least one processing element. Additionally, certain features of the embodiments of the claimed subject matter have been illustrated as described herein, however, many modifications, substitutions, changes and equivalents will now occur to those skilled in the art. Additionally, while several functional blocks and relations between them have been described in detail, it is contemplated by those of skill in the art that several of the operations may be performed without the use of the others, or additional functions or relationships between functions may be established and still be in accordance with the claimed subject matter. It is, therefore, to be understood that the appended claims are intended to cover all such modifications and changes as fall within the true spirit of the embodiments of the claimed subject matter.

The invention claimed is:

1. A method comprising:
receiving a first set of code by a virtual machine;
providing at least a portion of the first set of code to a compiler;
partitioning the at least a portion of the first set of code into a plurality of groupings of code;
compiling at least one of the groupings of code into a plurality of second sets of code; and
providing at least two of the second sets of code to differing processor resources, wherein the differing processor resources include a plurality of processing elements embodied on one processor device.

2. The method of claim 1, wherein said receiving the first set of code comprises:
the first set of code including one or more byte code modules, the byte code modules received by a logical byte code receiver interface of the virtual machine.

3. The method of claim 1, wherein said receiving the first set of code comprises: the first set of code including a software program, wherein the software program is received as one or more byte code modules.

4. The method of claim 1, wherein said partitioning is based on the resources available to the one processor device, and at least one function of the first set of code.

5. The method of claim 4, wherein the resources comprise one or more processing elements from among the plurality of processing elements embodied on the one processor device.

6. The method of claim 1, further including:
generating one or more sets of code to provide a logical link for calling functions between the two or more sets of code on different processing elements from among the plurality of processing elements.

7. A method of comprising:
receiving two or more sets of byte code;
grouping the two or more sets of byte code into two or more tasks and defining a relational structure between at least a portion of the two or more tasks to generate a syntax graph;
partitioning the two or more tasks into two or more sub tasks based on the syntax graph and resources required for performing the two or more tasks; and
providing at least a portion of the two or more sub tasks to different resources of a processor device, wherein the different processing resources of the processor device include a plurality of processing elements embodied on the processor device.

8. The method of claim 7, wherein said partitioning further comprises determining processor mapping for at least a portion of the two or more sub tasks, and providing logical partitions based at least in part on the processor mapping.

9. The method of claim 7, wherein said receiving comprises:
being provided one or more byte code modules, wherein the receiving is performed by a byte code interface of the virtual machine, and providing the one or more byte code modules to a compiler.

10. The method of claim 7, wherein said partitioning is based on the resources available to a resource performing at least a portion of said partitioning, and at least one function of the first set of code.

11. The method of claim 7, wherein the plurality of processing elements comprise one or more processing elements of a multi-core processor.

12. The method of claim 7, wherein said partitioning is based at least in part on feedback obtained from a previous partitioning, wherein the feedback is obtained from a fitness score that measures said partitioning based on one or more metrics.

13. The method of claim 7, wherein said partitioning is performed one or more times prior to said providing, based at least in part on the feedback.

14. A method of comprising:
receiving a software program by a processor device, the software program including a plurality of instructions written in a language;
determining in a compiler a relational structure for at least a portion of the plurality of instructions;
determining available resources of the processor device, the available resources including a plurality of processing elements embodied on the processor device;
partitioning in the compiler the software program, the software program partitioned into a plurality of tasks and providing at least a portion of the plurality of tasks respectively to one or more processing elements from among the plurality of processing elements, wherein the partitioning is based at least in part on the relational structure and available resources to the plurality of processing elements.

15. The method of claim 14 wherein the software program comprises a plurality of byte codes.

16. The method of claim 14 wherein the relational structure comprises an syntax graph.

17. The method of claim 14 wherein the partitioning further comprises providing two or more of tasks from among the plurality of tasks to different available resources.

18. The method of claim 14 wherein the software program is received as one or more byte code modules.

19. The method of claim 14 wherein said partitioning is based on the resources available to the compiler, and at least one function of the plurality of instructions.

20. The method of claim 14 wherein the plurality of processor elements embodied on the processor device includes one or more processing elements of a multi-core processor.

21. The method of claim 14 wherein the partitioning is based at least in part on feedback obtained from a previous partitioning, wherein the feedback is obtained from a fitness score that measures the partitioning based on one or more metrics.

22. A system comprising:
a network device; and
a compiler, the compiler to include:
a byte code analyzer to receive a related set of byte codes;
a code partitioning heuristics engine to partition the related set of byte codes into a plurality of partitioned byte codes based at least in part on the available resources of the network device and the functions embodied in at least a portion of the related set of byte codes: and
at least one synthesizer to translate the partitioned byte codes to native instructions for the one or more processing elements and provide at least a portion of the native instructions respectively to a plurality of processing elements embodied on the network device.

23. The system of claim 22 wherein said partitioning is based on the resources available to the compiler and at least one function of the related set of byte code.

24. The system of claim 22 wherein the available resources comprise one or more hardware components embodied on the network device.

25. The system of claim 22 the one or more hardware components comprise one or more dedicated hardware accelerators, wherein the compiler generates code for the plurality of processing elements embodied on the network device to utilize the one or more dedicated hardware accelerators to execute one or more byte codes from among the related set of byte codes, the one or more byte codes are offloaded from the plurality of processing elements.

26. The system of claim 22 wherein the native instructions for the one or more processing elements comprises machine language.

27. The system of claim 22 wherein the plurality of elements embodied on the network device comprise one or more heterogeneous processing elements of a multi-core processor.

28. The system of claim 22 wherein said partitioning the related set of byte codes into a plurality of partitioned byte codes is based at least in part on feedback obtained from a previous partitioning, the feedback obtained from a fitness score that measures said partitioning based on one or more metrics.

29. The system of claim 22 wherein said partitioning the related set of byte codes into a plurality of partitioned byte codes is performed one or more times prior to said providing at least a portion of the plurality of partitioned byte codes, based at least in part on the feedback.

30. An article comprising:
a storage medium;
the storage medium including stored instructions that, when executed by a processor device, result in receiving two or more sets of code, grouping the two or more sets of code into one or more tasks, partitioning the one or more tasks into two or more sub tasks, and providing said two or more sub tasks to one or more processor elements embodied on the processor device.

31. The article of claim 30 wherein the one or more tasks comprises an syntax graph.

32. The article of claim 30 wherein the grouping comprises defining a relational structure between at least a portion of the two or more sets of code.

33. The article of claim 30 said partitioning further comprises determining processor mapping for at least a portion of said two or more sub tasks, the processor mapping to the one or more processor elements, wherein, logical partitions are provided based at least in part on the processor mapping determination.

34. The article of claim 30 wherein said receiving comprises:
being provided one or more byte code modules, wherein the receiving is performed by a byte code interface of a compiler associated with the processor device.

35. The article of claim 30 wherein said partitioning is based on the resources available to the compiler and at least one function of the first set of code.

36. The article of claim 35 wherein the resources include one or more processor elements embodied on the processor device.

* * * * *